United States Patent [19]

Wollet et al.

[11] Patent Number: 4,988,860

[45] Date of Patent: Jan. 29, 1991

[54] ELECTRONIC TRIGGER FOR PREPAY TYPE TELEPHONE PAYSTATIONS

[75] Inventors: William M. Wollet, Huntsville; Gary Grantland, Hartselle, both of Ala.

[73] Assignee: Palco Telecom Inc., Nashville, Tenn.

[21] Appl. No.: 491,052

[22] Filed: Mar. 9, 1990

[51] Int. Cl.[5] .................. G01N 9/04

[52] U.S. Cl. .................. 250/223 R; 453/4

[58] Field of Search .................. 250/223 R, 560; 453/4, 453/3; 209/576

[56] References Cited

U.S. PATENT DOCUMENTS

| | | | |
|---|---|---|---|
| 3,916,922 | 11/1975 | Prümm | 453/3 |
| 4,082,099 | 4/1978 | Iwersen | 453/4 |
| 4,228,811 | 10/1980 | Tanaka et al. | 453/3 |
| 4,436,103 | 3/1984 | Dick | 453/4 |

*Primary Examiner*—David C. Nelms
*Assistant Examiner*—K. Shami
*Attorney, Agent, or Firm*—Robert J. Black

[57] ABSTRACT

A trigger switch for use in coin operated devices and particularly in telephone paystations consisting of a plurality of parallel channels each including one or more openings through which a light beam passes. Deposit of coins in the appropriate channels blocks one or more light beams passing through the openings causing detection of the light blockage by associated light detectors to operate to give an indication of the quantity and value of coins deposited through the coin channels. A common trigger mechanism is also included and operates in response to deposit of any coins through the trigger switch, to provide operation of an associated coin relay.

11 Claims, 2 Drawing Sheets

ELECTRONIC TRIGGER FOR PREPAY TYPE TELEPHONE PAYSTATIONS

BACKGROUND OF THE INVENTION

1. Field of the Invention

The present invention relates to coin operated devices, and more particularly to a coin operated trigger switch for use in prepay type telephone paystations.

2. Background Art

The present invention is suitable for use in prepay type telephone paystations similar to those in current use and particularly for use in such telephone paystations as the type 120B and 2200 telephones currently manufactured by Palco Telecom Inc. In such units, in response to the deposit of coins of the appropriate amount, a signal is transmitted to the telephone central office to indicate the users desire to place a telephone call from the associated telephone paystation. The signal is also utilized for establishing an energizing circuit for an associated coin relay. After the telephone central office senses the request for placement of the call, battery from the central office may be applied to the line to energize the relay whose armature serves to release coins that have been trapped in an associated coin trap after passing past the trigger. At the telephone central office, application of voltage of one polarity will cause the coins to be collected or application of an opposite polarity will cause the coins to be returned via a refund chute if such refund is appropriate. Operation of the relay also serves to restore the coin trigger circuitry to normal.

Many different types of coin trigger devices have been employed for use in telephone paystations or in other coin collecting machines. Such triggers find their usage between a coin acceptor/rejector, which determines whether the coins are valid or not, and the associated coin hopper/relay. Such coin trigger devices employ various methods of identifying and counting coins. The device of the present invention is intended to replace the traditional coin chutes as utilized in pay telephones although it may be modified for use in other applications.

Prior art coin chutes included coin operated trigger cams and spring contact in an assembly consisting of three channels. The three channels being associated with the deposit of nickels, dimes and quarters. In the prior art devices, the trigger cam in each channel of the prior art trigger arrangements operated a spring contact assembly for each coin deposited. The trigger cam also operated a switch mounted on the coin hopper relay assembly.

SUMMARY OF THE INVENTION

The present invention utilizes a completely different concept for identification of coins. Two small printed wiring cards are mounted on each side of a multi-element coin chute. One printed circuit card contains two light emitters while the other includes two light detectors. A light beam produced by a light emitter passes through openings in each of the elements of the multi-element coin chute portion of the invention so that when a light beam is broken by a coin passing between two of the elements, the light beam will be broken and the opposite detector will sense the absence of light from the light emitter and then generate an appropriate signal. Logic circuitry on the associated printed card where the light detectors are mounted is able to determine what the quantity and values of coins deposited are and whether they are appropriate for initiating a telephone call or appropriate for subsequent deposit as may be required for toll calls. The coins are guided by specifically arranged channels that are part of the multi-element arrangement so that a dime will break one light path, a nickel the other, and a quarter will break both light paths.

In addition to the guiding of coins through the appropriate light paths, the coin channels are designed to slow the travel of the coin so that it will remain in the light path for a longer period of time thus ensuring accurate detection of the coins as they pass through the various coin channels to cause appropriate signals to be generated by the logic circuit associated with the light detectors.

As can be seen from the foregoing, mechanical contact springs are completely eliminated by use of the present invention, thus eliminating the detailed requirements of assembly, adjustment and subsequent maintenance.

In the arrangement as taught by the present invention, a single trigger replaces the three triggers found in the prior art and also the necessity for a return coil spring. The single trigger is mounted on a shaft and includes a number of protrusions which lay across the bottom of each of the coin channels. As set forth, this arrangement eliminates the possibility of coins jamming between the trigger and the coin channel wall as is often the case with prior art triggers and chutes employed therewith. In the present invention, the trigger cam operates the coin relay hopper switch and also acts as a counter-weight to restore the trigger to the operation position.

DESCRIPTION OF THE PREFERRED EMBODIMENT

Figure 1:
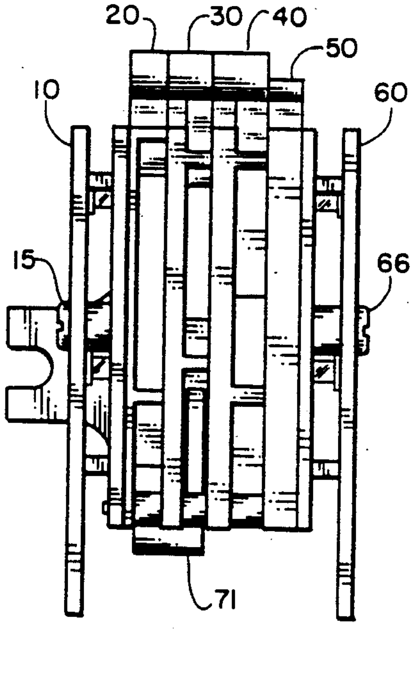
FIG. 1 is a top plan view of a trigger switch for use in telephone paystations in accordance with the present invention.
Figure 2:
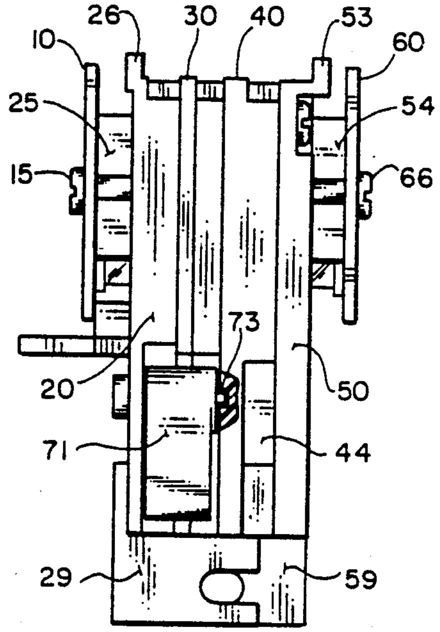
FIG. 2 is a front view of a trigger switch for use in telephone paystations in accordance with the present invention.
Figure 4:
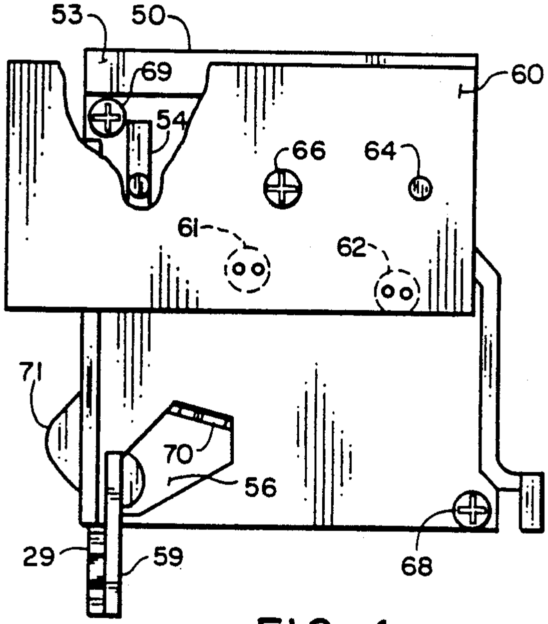
FIG. 4 is a partially cut out right side view of a trigger switch for use in telephone paystations in accordance with the present invention.

Referring now to FIGS. 1, 2, 3, 4 and 5, the coin chute portion of the present invention consists of four plastic panels, or elements, 20, 30, 40 and 50, which when assembled are nested together as seen in FIGS. 1 and 2 are held together by means of screws 68 and 69. A single trigger 70 on its associated shaft 72 is captured between recesses 28 on panel 20 and 48 (not shown) on panel 40. This can be seen particularly by reference to FIG. 5.

When assembled the protrusions on trigger 70 extend into the dime chute which exists between panels 30 and 40 and as defined by ribs 34 and 35 which are on either side of opening 32. Another trigger protrusion extends into the nickel slot which exists between panels 40 and 50 and is defined by ribs 43 and 44 which are on either side of opening 41. The other protrusion of trigger 70 extends into the quarter slot area which exists between panels 20 and 30 and is further defined between ribs 23 and 24 which are on either side of openings 21 and 22. All of the above noted ribs also act as spacers to maintain the panels 20, 30, 40 and 50 apart. When assembled, panels 20 and 50 include an associated flange, such as 25 and 53, which are used in mounting the trigger switch of the present invention within a telephone paystation.

Printed wiring cards 10 and 60 are mounted on the left and right side, respectively, of the trigger assembly and secured by screws 15 and 66, respectively. Located on the exterior surfaces of panels 20 and 50 are spacers and a screw receiving boss, which as may be in seen in FIG. 5, include spacers 54 and 55 and boss 57 on panel 50. Similar spacers and a boss are also found on the outside surface of panel 20 which are not shown but which are substantially identical to those located on panel 50.

Figure 5:
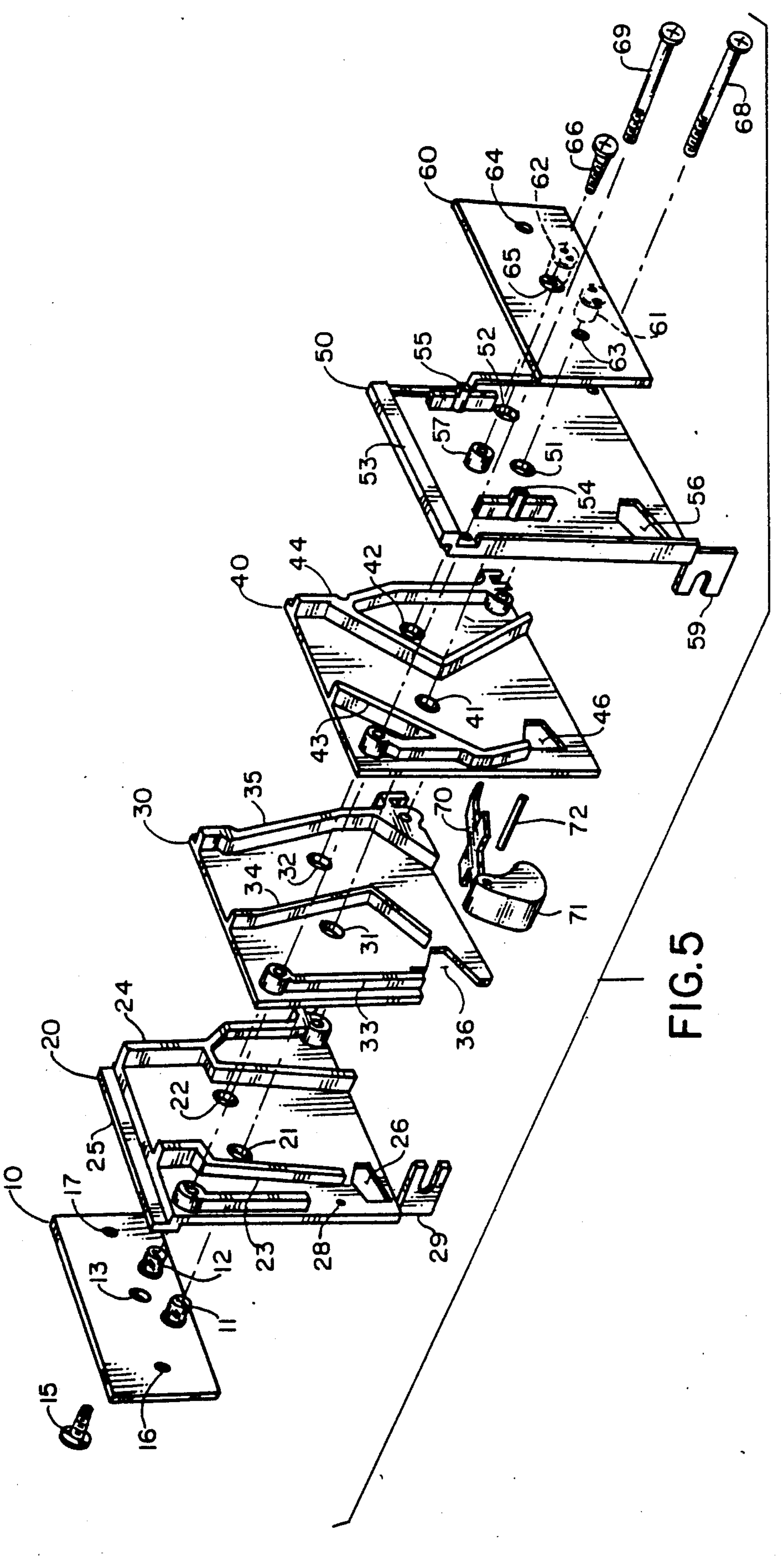
FIG. 5 is an exploded perspective view of a trigger switch for use in telephone paystations in accordance with the present invention.

Two small openings 63 and 64 are located on printed wiring card 60 and are used to engage the projections on supports 54 and 55 while screw 66 goes through opening 65 and seats in boss 57. A similar arrangement for mounting printed wiring card 10 utilizes openings 16 and 17 for engaging the supports on the backside of panel 20, with mounting screw 15 passing through opening 13 and engaging a boss again located on the rear side of panel 20 but not shown. As noted above, the rear side of panel 20 has not been shown inasmuch s it is virtually identical to the outside of panel 50 as seen in FIG. 5.

In the arrangement as shown, two light emitters 11 and 12, which may be of any well known type, are mounted on printed wiring card 10. The circuitry for operating these and the necessary power source are not shown inasmuch as they do not constitute a portion of the present invention. It only being required that the light sources 11 and 12 be so positioned as to provide light beams that pass through the entire trigger switch mechanism. Light from source 12 passes through openings 22, 32 and 42 and falls on light detector 62 (shown in phantom) which is mounted on printed wiring card 60. Likewise, light from source 11 passes through openings 21, 31, 41 and 51 and the beam falls onto light detector 61 (shown in phantom) also mounted on printed wiring card 60. The details of the light detectors, which may take several forms, also have not been shown, inasmuch as they do not form a portion of the present invention. It only being required that there be circuitry on the associated printed wiring card that in response to operation of a light detector provides the necessary logic signals to the telephone office and to additional internal circuitry of the telephone paystation.

As may be seen from the foregoing, a dime passing through the channel defined by panels 30 and 40 and ribs 34 and 35 will break the light path between emitter 12 and detector 62. Deposit of a nickel will go through the channel defined by panels 40 and 50 and ribs 43 and 44 and 25 will break the light from emitter 11 as it passes through opening 41 blocking it from passing onto light detector 61.

when a quarter is deposited, it will pass through the quarter channel which is defined by panels 20 and 30, as well as ribs 23 and 24, and will block the light at openings 21 and 22 which interrupts the beams from light emitters 11 and 12, blocking the light from falling on both of the detectors 61 and 62 located on printed wiring card 60. Thus, this combination of one or the other or both of the paths being broken will provide the necessary inputs at light detectors 63 and 64 and to the associated logic circuitry mounted on that printed wiring card. As noted previously, that circuitry, however, does not form a portion of the present invention, it only being required by the present invention that the detectors operate as outlined previously.

Figure 3:
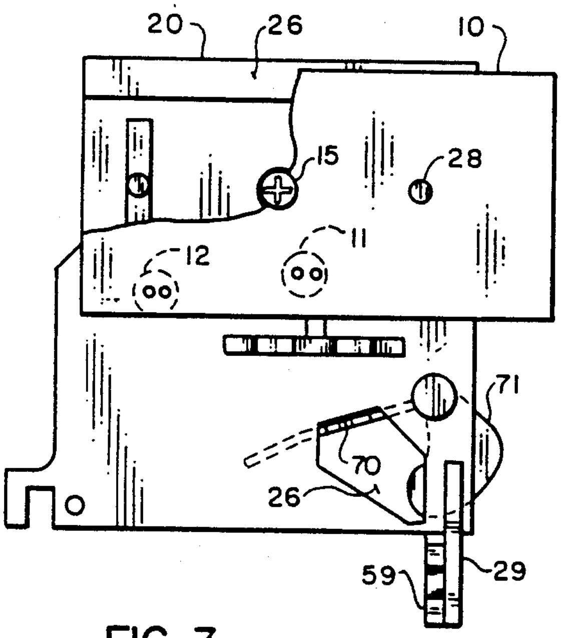
FIG. 3 is a partially cut out left side view of a trigger switch for use in telephone paystations in accordance with the present invention.
Figure 3A:
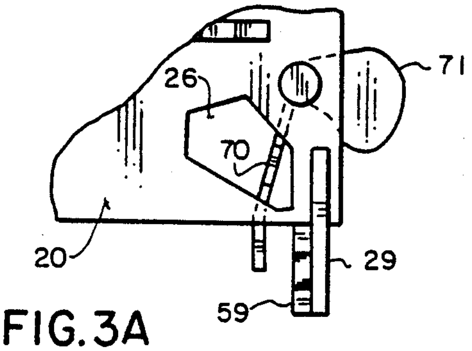
FIG. 3A is a partial left side view of a trigger switch in accordance with the present invention showing the trigger in the operated position.

Trigger 70 includes protrusions extending into each of the three channels, nickel, dime and quarter, respectively, and is caused to operate by deposit of any coin. By action of cam 71, a switch contact on an associated coin hopper relay assembly (which does not form a portion of the present invention) is operated. When the total coins are collected; by means of an outside signal from the telephone central office, the switch contact will then be reset at which time the cam counter-weight 71 on the coin chute trigger 70 would restore the trigger to its normal position. The operated position being shown in FIG. 3A, while the normal position is easily seen in FIG. 3, as well as FIG. 4.

From the foregoing description and the accompanying drawings, it would be apparent that because of spacing, coins of appropriate denominations will only pass through those portions of the included trigger mechanism which are appropriate for the size of the coin. Accordingly, that passage of coin through the appropriate coin chute will cause a blockage of light beams causing associated logic circuitry to function and to determine that the quantity and value of coins required have been appropriate deposited.

While but a single embodiment of the present invention has been shown it will be obvious to those skilled in the art that numerous modifications may be made without departing from the spirit of the present invention which shall be limited only by the scope of the claims appended hereto.

What is claimed is:

1. A trigger switch for use in a coin operated device comprising:
   - a plurality of light sources;
   - a plurality of light detectors;
   - a plurality of coin conducting elements positioned adjacent to each other, all of said elements being positioned between said light sources and said light detectors;
   - each of said elements including a plurality of means allowing transmission of light from said light sources to pass through said elements to said light detectors;
   - each of said elements facilitating the passage of a different single value of coin through said element;
   - and a common trigger mechanism associated with all of said coin conducting elements including a portion projecting into each of said elements and further including a cam counterweight;
   - the passage of a coin through any of said elements effective to block the transmission of light from at least one of said light sources to at least one of said light detectors and to operate said trigger mechanism, said common trigger mechanism cam counterweight operated in response to said passage of a coin through any of said channels to provide an actuating force for an associated coin relay.

2. A trigger switch for use in a coin operated device as claimed in claim 1 wherein:

each of said coin conducting elements includes a pair of parallel panels.

3. A trigger switch for use in a coin operated device as claimed in claim 2 wherein:

each of said panels includes a plurality of light passing openings.

4. A trigger switch for use in a coin operated device as claimed in claim 2 wherein:

each of said coin conducting elements further includes a pair of ribs separating said parallel panels, the combinations of said parallel panels and said ribs defining a coin conducting channel.

5. A trigger switch for use in a coin operated device as claimed in claim 4 wherein:

said channel is sized to facilitate the passage of a single value of coin through said channel.

6. A trigger switch for use in a coin operated device as claimed in claim 5 wherein:

said common trigger mechanism includes a portion projecting into each of said channels included in each of said coin conducting elements.

7. A trigger switch for use in a coin operated device as claimed in claim 6 wherein:

each of said panels includes an additional opening;

and a different portion of said common trigger mechanism projects through each of said additional openings into at least one of said coin conducting channels.

8. A trigger switch for use in a coin operated device as claimed in claim 1 wherein:

said plurality of light sources are located on a printed wiring board located adjacent to said coin conducting elements.

9. a trigger switch for use in a coin operated device as claimed in claim 1 wherein:

said plurality of light detectors are mounted on a printed wiring board in a position adjacent to said coin conducting elements.

10. A trigger switch for use in a coin operated device as claimed in claim 9 wherein:

said printed wiring card mounting said light detectors further includes logic circuitry connected to said light detectors.

11. A trigger switch for use in a coin operated device comprising:

a plurality of light sources mounted on a first printed wiring card;

a plurality of light detectors mounted on a second printed wiring card including logic circuitry connected to said light detectors;

a plurality of coin conducting elements positioned adjacent to each other;

all of said elements positioned adjacent to each other and between said light sources and said light detectors;

each of said elements including a plurality of means allowing transmission of light from said light sources to pass through said element to said light detector;

each of said coin conducting elements including a pair of ribs separating said parallel panels wherein the combination of said parallel panels and said ribs define a coin conducting channel sized to facilitate the passage of a single value of coin through said channel;

a common trigger switch including a portion projecting into each of said channels including each of said coin conducting elements;

whereby the passage of a coin through any of said channels is effective to block the transmission of light from at least one of said light sources to at least one of said light detectors and to operate said common trigger mechanism.

* * * * *